(12) United States Patent
Iwasaki et al.

(10) Patent No.: US 6,429,411 B1
(45) Date of Patent: Aug. 6, 2002

(54) MAGNETIC TAPE PROCESSING METHOD AND MAGNETIC TAPE PROCESSING APPARATUS HAVING AN OPTICAL SYSTEM

(75) Inventors: Osamu Iwasaki; Satoru Hayakawa; Hiroo Inaba; Takeshi Nagata, all of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/456,811

(22) Filed: Dec. 8, 1999

(30) Foreign Application Priority Data

| Dec. 8, 1998 | (JP) | ............................................. | 10-348450 |
| Jan. 25, 1999 | (JP) | ............................................. | 11-015442 |
| Mar. 12, 1999 | (JP) | ............................................. | 11-066597 |
| Apr. 7, 1999 | (JP) | ............................................. | 11-099927 |
| Apr. 20, 1999 | (JP) | ............................................. | 11-112676 |

(51) Int. Cl.[7] ............................................. G02B 7/04
(52) U.S. Cl. .................. 250/201.5; 250/559.4
(58) Field of Search .................. 250/201.5, 208.1, 250/234, 559.4, 559.36; 360/251.2, 251.5; 369/44.14, 44.11

(56) References Cited

U.S. PATENT DOCUMENTS 3,614,453 A * 10/1971 Johnson ....................... 250/235

FOREIGN PATENT DOCUMENTS

JP 11-213384 8/1999

* cited by examiner

*Primary Examiner*—Que T. Le
(74) *Attorney, Agent, or Firm*—Sughrue Mion, PLLC

(57) ABSTRACT

The magnetic tape processing method and apparatus allow at least one of a laser beam or laser beams in a visible region and a laser beam or laser beams in an ultraviolet region to be incident on a backing layer of a magnetic tape while transporting the magnetic tape in a lengthwise direction of the magnetic tape and process the backing layer by means of the laser beam or laser beams to form recesses on the backing layer. The processed magnetic tape is composed of a base layer, a magnetic layer formed on one surface of the base layer and the backing layer formed on another surface of the base layer and having recesses which are formed by processing the backing layer by means of the laser beam or laser beams. The method and apparatus can efficiently manufacture the magnetic tape having excellent characteristics such that the occurrence of the slip of the magnetic tape is not caused on a capstan roller and the like, even if the transportation speed of the tape is increased in a magnetic tape manufacturing apparatus, and furthermore a size of cupping of the magnetic tape is small.

16 Claims, 8 Drawing Sheets

FIG.2A  FIG.2B  FIG.2C
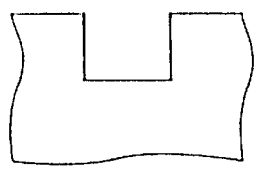
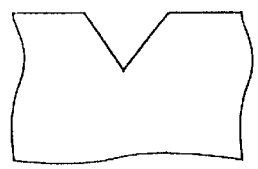
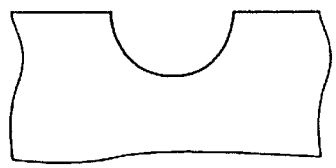
FIG.3
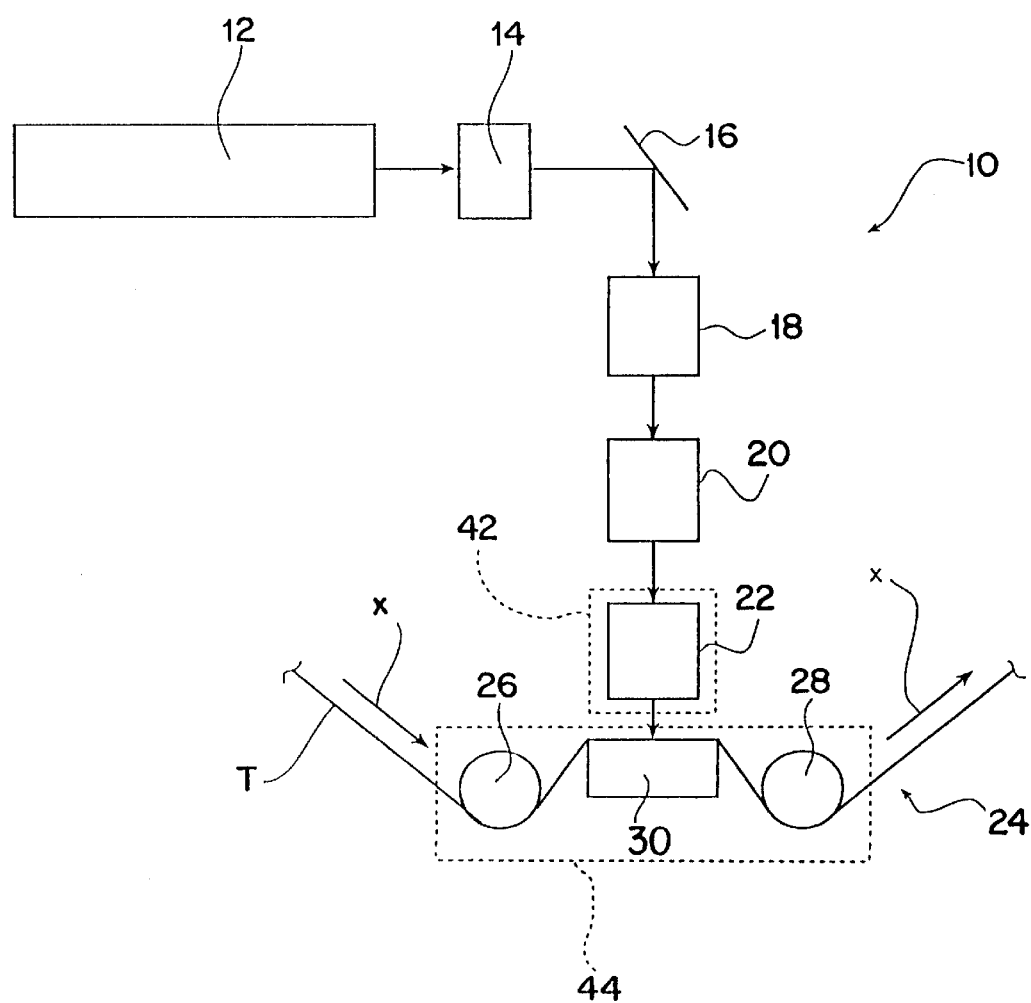

MAGNETIC TAPE PROCESSING METHOD AND MAGNETIC TAPE PROCESSING APPARATUS HAVING AN OPTICAL SYSTEM

BACKGROUND OF THE INVENTION

The present invention belongs to the technical field of a magnetic tape used for the record and reproduction of information. More particularly, the present invention relates to magnetic tape processing method and apparatus capable of effectively manufacturing a magnetic tape in such a manner that even if the magnetic tape is transported at a high speed in the manufacturing process and the like thereof, no slip is caused to the magnetic tape and thus the damage of the magnetic tape and the disturbance of the wound appearance thereof due to the slip can be prevented and further cupping is also reduced.

Magnetic tapes used to record and reproduce information are basically composed of a base layer which is a film such as PET (polyethylene terephthalate) and the like, a magnetic layer formed on one of the surfaces of the base layer, a backing layer formed on the surface of the base layer opposite to the magnetic layer for the purpose of improving the stability of the magnetic tape when it is transported and the strength thereof, and the like.

In the manufacturing process of the magnetic tapes, a magnetic tape (hereinafter, referred to as tape) is subjected to various types of processing such as the cutting of the tape with a slitter, the cleaning of the surface thereof with a blade edge while it is transported in the lengthwise direction thereof, made to a pancake or a cassette by being wound around a hub and delivered to the next process or to a customer. Incidentally, there is recently a tendency that tapes are transported at a high speed (transportation speed is increased), in various types of processes (manufacturing apparatus such as a blade machine, a winder and the like) for the enhancement of productivity.

The transportation of a tape is carried out by wrapping it on a capstan roller and rotating the capstan roller.

However, when the transportation speed of the tape is increased, the tape entraines air in the manufacturing apparatus such as the blade machine, slitter and the like and floats above the capstan roller and the like, whereby the tape slips and may no be normally transported.

As a result, the tape collides against or comes into improper contact with the capstan roller, a guide roller, the blade edge and the like, whereby the damage of the tape is caused such as the breakage of the tape itself or the edge thereof, the wear and peeling of the magnetic layer, and the like. Thus, a resulting tape is made improper as a product. Further, a roller for measuring a tape length (length detecting roller) is mounted on the tape manufacturing apparatus when necessary. However, when the tape slips on the length detecting roller, an error arises in the measurement of the tape length and thus a problem also arises in that the production of the tape cannot be properly managed.

Accordingly, it is difficult to increase the tape transportation speed in correspondence to the required improvement of a manufacturing efficiency in the manufacture of tape.

Further, cupping is known as another problem of magnetic tapes. Cupping is the curl of a magnetic tape in the width direction thereof and mainly caused by the difference of shrinking ratios between respective binders used in a magnetic layer and a backing layer.

Various problems are caused by the occurrence of the cupping such as the deterioration of the outside appearance of a magnetic tape as a product; the possibility of the occurrence of recording error and reading error due to the deteriorated touch of the magnetic tape against a recording head and a reading head; the lowered durability of the magnetic tape because the edges thereof are liable to be damaged, and the like.

The cupping can be improved by the methods of increasing the thickness of a magnetic layer, reducing the thickness of a backing layer, adjusting the prescription of the magnetic layer and the backing layer, and the like. However, the improvement of the cupping is limited by various kinds of problems in manufacturing process, prescription, performance capability, and the like.

More specifically, recently, the recording density of a magnetic tape has been improved. To realize the improvement, the thickness of the magnetic layer tends to be reduced. When the thickness of the backing layer is reduced accordingly for the purpose of preventing cupping, the strength of the magnetic tape is lowered and a problem arises in the durability of the tape when it is in practical use. Further, when the prescription of the magnetic layer and the backing layer is changed, the characteristics of the magnetic tape are changed and there is a possibility that a target performance capability cannot be obtained.

That is, it is a very time-consuming job to reduce the cupping by adjusting the prescription of the magnetic layer, the backing layer and the like while preventing the deterioration of the performance capability. Thus, this job is very disadvantage in the efficiency of development, the cost of the magnetic tape, and the like.

SUMMARY OF THE INVENTION

A first object of the present invention is to solve the problems of the conventional technology and to provide a magnetic tape processing method and apparatus which can efficiently manufacture a magnetic tape having excellent characteristics such that the occurrence of the slip of the magnetic tape is not caused on a capstan roller and the like, even if the transportation speed of the tape is increased in a magnetic tape manufacturing apparatus, and furthermore a size of cupping of the magnetic tape is small.

The second object of the present invention is to provide a magnetic tape processing apparatus which can manufacture efficiently the magnetic tape having the excellent characteristics described above and carry out the magnetic tape processing method described above.

The use of the magnetic tape processed by the present invention permits the magnetic tape to be precisely transported at a high speed in the magnetic tape manufacturing apparatus such as a blade machine, a winder and the like. Accordingly, a magnetic tape without damage can be stably manufactured with a high manufacturing efficiency under proper production management and further when the magnetic tape is wound and made to a winder and a pancake, the wound appearance of the magnetic tape can be made beautiful. Furthermore, the deteriorated outside appearance of the magnetic tape, the deteriorated abutment of the magnetic tape against a head, the damage of the edges of the magnetic tape, and the like due to the cupping can be also prevented.

To achieve the first object described above, the present invention provides a magnetic tape processing method characterized by comprising the steps of allowing at least one of a laser beam or laser beams in a visible region and a laser beam or laser beams in an ultraviolet region to be incident on a backing layer of a magnetic tape while transporting the magnetic tape in a lengthwise direction of the magnetic tape;

and processing the backing layer by means of the laser beam or laser beams to form recesses on the backing layer.

In the magnetic tape manufacturing method of the present invention, it is preferable that the laser beam or laser beams incident on the backing layer of the magnetic tape is at least one of a plurality of laser beams which are divided and imaged by a multiple-lens, a plurality of laser beams divided by a divider and a laser beam scanned by at least one light scanning element, it is preferable that the multiple-lens is arranged such that lenses disposed in at least one of a densest state, a grid state, and one row and a plurality rows in a direction having an angle with respect to the lengthwise direction, is preferable that processing intensity of an recess formed on the backing layer is increased by forming the recess with a plurality of laser beams by overlapping optical axes of the lenses in the lengthwise direction, it is preferable that at least one of reciprocating motion of the magnetic tape in a direction perpendicular to a transporting direction of the magnetic tape, reciprocating motion of the laser beam or laser beams in the direction perpendicular to the transporting direction of the magnetic tape, and adjustment of intervals at which the recesses are formed is carried out while the backing layer is being processed, and further it is preferable that the laser beam or laser beams is at least one of a laser beam of 488 nm and a laser beam of 515 nm emitted from argon lasers and a laser beam of 532 nm obtained by subjecting a YAG laser to wavelength conversion with a second harmonic generation element.

Further, to achieve the second object described above, the present invention provides a magnetic tape processing apparatus characterized by comprising at least one light source for emitting at least one laser beam in at least one of a visible region and an ultraviolet region; an optical system for applying the at least one laser beam emitted from the at least one light source to a predetermined processing position or positions; a transportation device for transporting a magnetic tape in a lengthwise direction of the magnetic tape at the predetermined processing position or positions in a state that a backing layer of the magnetic tape faces upper stream of at least one light path of the at least one laser beam; and a device for securing the flatness of the magnetic tape transported by the transportation device at the predetermined processing position of positions.

In the magnetic tape processing apparatus of the present invention, it is preferably that the optical system includes a beam expander and a multiple-lens, it is preferable that the multiple-lens is arranged such that lenses disposed in at least one of a densest state, a grid state, and one row and a plurality rows in a direction having an angle with respect to the lengthwise direction, it is preferable that processing intensity of an recess formed on the backing layer is increased by forming the recess with a plurality of laser beams by overlapping optical axes of the lenses in the lengthwise direction, it is preferable that the optical system includes a beam waist position adjustment device, a laser beam divider and a converging lens, it is preferable that the at least one light source is composed of a semiconductor laser array and the optical system includes an imaging device for imaging laser beams emitted from the semiconductor laser array, it is preferable that the optical system includes a light deflecting element for scanning at least one laser beam at an angle with respect to a transporting direction of the magnetic tape transported by the transportation device and a scanning lens, it is preferable that the magnetic tape processing apparatus further comprises at least one of a device for reciprocating the magnetic tape in a direction perpendicular to a transporting direction of the magnetic tape at the predetermined processing position or positions, device for reciprocating the laser beams in a direction perpendicular to the transporting direction of the magnetic tape at the predetermined processing position or positions, and a device for adjusting the intervals at which the laser beams are irradiated to the magnetic tape, it is preferable that the at least one light source is at least one of an argon laser of 488 nm, an argon laser of 515 nm and a wavelength conversion laser for emitting a laser beam of 532 nm which is obtained by subjecting a YAG laser to wavelength conversion with a second harmonic generation element, it is preferable that the transportation device comprises a transportation drive device including a capstan roller, a rewinder and a winder, and at least one guide roller, and wherein the securing device is a tape flatener, it is preferable that the tape flatener is touched against a surface of a magnetic layer side of the magnetic tape being transported and positions the magnetic tape at the predetermined processing position or positions, it is preferable that the at least one guide roller is two guide rollers are disposed in the lengthwise direction across the tape flatener, wherein a transportation passage of the magnetic tape formed by the two guide rollers is below a transportation passage of the magnetic tape formed by the tape flatener and wherein the magnetic tape is positioned at the processing position or positions by being pressed against the tape flatener and supported on the tape flatener, it is preferable that the tape flatener is at least one of at least two triangular prisms, a plurality of support members as semi-circular columns, a plurality of support members as columns and a plate type flatener, it is preferable that the laser beam reciprocating device is at least one of a piezo-electric element and a voice coil which move a multiple-lens of the optical system, it is preferable that wave-shaped recesses on the backing layer of the magnetic tape are formed by reciprocating the laser beams with the laser beam reciprocating device such that the wave-shaped recesses are not overlapped on at least upper and lower turns of the magnetic tape when the magnetic tape is wound, it is preferable that the laser beam reciprocating device is arranged the light source and the optical system as a unit and reciprocates the unit.

Further the present invention provides a magnetic tape processing apparatus characterized by comprising a hollow cylindrical drum being rotatable about an axial line thereof and provided with light passing portions and shading portions which are formed in a predetermined pattern along a cylindrical wall thereof; at least one light source for emitting at least one laser beam; an optical system for making to a sheet-shaped laser light and then introducing the sheet-shaped laser light in a hollow portion of the hollow cylindrical drum to apply the sheet-shaped laser light to a row of the light passing portions of the hollow cylindrical drum from inside to outside; and a transportation device for transporting a magnetic tape in a lengthwise direction thereof in contact with or in no contact with a circumferential surface of the hollow cylindrical drum, wherein the hollow cylindrical drum is rotated synchronously with the magnetic tape transported by the transportation device so that a row of divided laser beams passing through the row of light passing portions are incident on a backing layer of the magnetic tape to from recesses on the backing layer.

In the magnetic tape processing apparatus, it is preferable that the magnetic tape processing apparatus further comprises a rotating drive source for rotating the hollow cylindrical drum synchronously with the magnetic tape transported by the transportation device, it is preferable that the hollow cylindrical drum is a cylindrical tape guide having a multiplicity of apertures passing through a side wall and being rotatable about an axial line thereof, wherein the optical system comprises a sheet light forming device for making a sheet-shaped laser light and applying it to a interior of the cylindrical tape guide downwardly; and a mirror fixed in the interior of the cylindrical tape guide at an angle of 45° with its reflecting surface facing upward, the mirror bending the sheet-shaped laser light at an angle of 90° and applying it to an inner surface of the cylindrical tape guide so as to draw a line on the inner surface thereof, and wherein the cylindrical tape guide is rotated synchronously with the magnetic tape transported in contact with or in no contact with an outer surface of the cylindrical tape guide so that a multiplicity of divided laser beams passing through the multiplicity of the apertures are incident on a backing layer of the magnetic tape to form recesses on the backing layer, it is preferable that the apertures extends in an axial direction of the cylindrical tape guide, it is preferable that the line drawn by the sheet-shaped laser light extends in an axial direction of the cylindrical tape guide or a direction oblique to the axial direction, other line is a line drawn by the sheet-shaped laser light incident on a predetermined position of the inner surface of the cylindrical tape guide, it is preferable that the magnetic tape processing apparatus further comprises a guide cleaner for cleaning the outer surface of the cylindrical tape guide and being touched against the outer surface thereof, it is preferable that the apertures are one of through holes formed as the light passing portions in a shading cylinder and the light passing portions of a mask pattern having the light passing portions and the shading portions which is formed on a transparent cylinder, and wherein each of the shading cylinder having the through holes and the transparent cylinder having the mask pattern is the cylindrical tape guide, it is preferable that the through holes are formed by applying a YAG laser to the shading cylinder made of metal, and wherein the mask pattern is formed on the transparent cylinder composed of quartz glass using one of a vapor-deposited thin film by vapor deposition of metal, film transfer and print, it is preferable that the optical system further comprises small lenses disposed to the apertures and imaged the divided laser beams passing through the apertures on the backing layer of the of the magnetic tape through the small lenses, and further it is preferable that the small lenses are bead glasses, microball lenses, gradient index lenses of micro-mold lenses.

BRIEF DESCRIPTION OF THE DRAWINGS

FIGS. 2A, 2B and 2C are conceptual views showing the shapes of the processed lines (recesses) formed on the backing layer of the magnetic tape by the present invention, respectively.

FIG. 3 is a conceptual view of an embodiment of a magnetic tape processing apparatus of the present invention.

DETAILED DESCRIPTION OF THE INVENTION

A magnetic tape processing method and a magnetic tape processing apparatus of the present invention will be described in detail with reference to preferable embodiments shown in the accompanying drawings.

A magnetic tape, which can be used in the present invention, is a magnetic tape having such an ordinary layer arrangement that a base layer (base film) composed of PET, aramid resin or the like has a magnetic layer on one surface thereof and a backing layer (back coat layer) on the other surface thereof or the base layer further includes an overcoat layer (protective layer) and a lower coat layer deposited thereon.

In the present invention, the backing layer of the magnetic tape arranged as described above is processed to form recesses, preferably at least one of the linear or wave-shaped grooves extending in the lengthwise direction of the magnetic tape and grooves extending in a direction oblique to the lengthwise direction of the magnetic tape (hereinafter, referred to as an oblique direction).

Figure 1A:
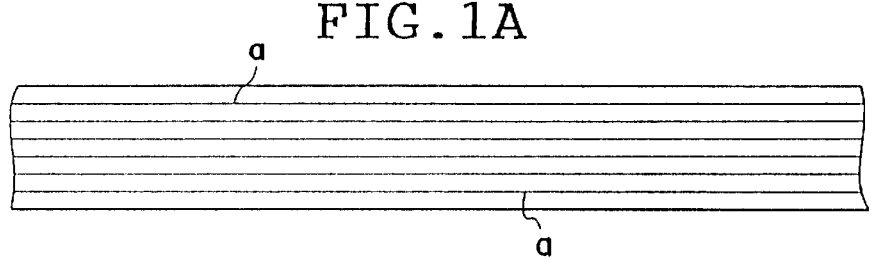
FIGS. 1A, 1B, 1C, 1D, 1E and 1F are conceptual views showing examples of processed lines (recesses) formed on the backing layer of a magnetic tape by the present invention, respectively.

FIGS. 1A–1F conceptually show the backing layers of the magnetic tapes processed by the magnetic tape processing method (hereinafter, referred to as processing method) of the present invention or the magnetic tape processing apparatus (hereinafter, referred to as processing apparatus) of the present invention In the example shown in FIG. 1A, a plurality of processed lines, a, which extend in the lengthwise direction of the magnetic tape (hereinafter, referred to as tape), are formed on the backing layer of the tape in which the width direction of the tape (hereinafter, referred to as width direction).

Figure 1B:
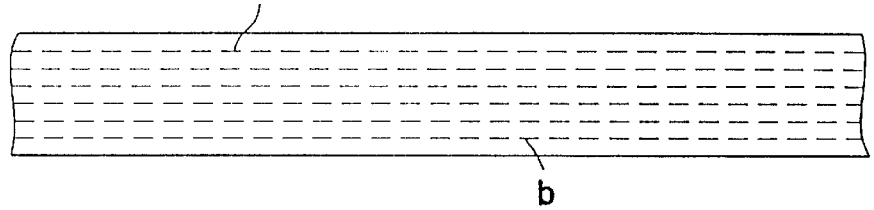

In the example shown in FIG. 1B, the backing layer is intermittently processed in the example shown in FIG. 1A so that the processed lines are divided to segments (made to processed line segments b). In other words, a plurality of rows of dotted lines (broken lines) made of the processed line segments are disposed in the width direction. In this example, the length of the processed line segments b is not particularly limited. Further, all the processed line segments b may have the same length or line segments having a different length may be mixed. Also, the processed line segments b may be aligned in the width direction or not.

Figure 1C:
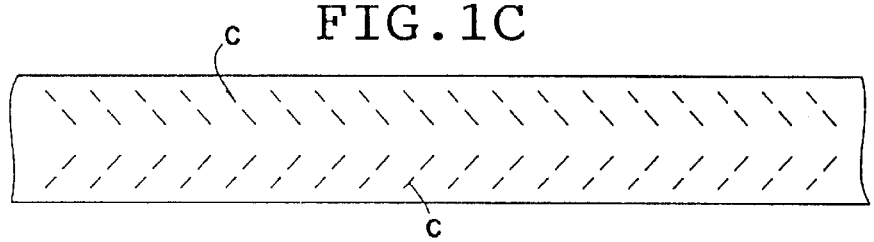

Further, in the example shown in FIG. 1C, processed line segments c are formed in an oblique direction. In this example, the angle and length of the processed line segments c are not particularly limited.

The tape is wound around a hub or a reel in a manufacturing process or at the time of shipment so that it is transported or shipped as a pancake or a cassette. However, when the tape having the processed lines or the processed line segments formed on the backing as described above is wound, the processed lines and the processed line segments of the wound tape are overlapped and irregular portions may be formed on the magnetic layer depending upon the formed state such as the depth and the like of the processed lines, and, as a result, there is a possibility that the tape is badly touched against a magnetic head and the record and reproduction of magnetic information is adversely affected thereby (head touch of the tape is deteriorated).

Figure 1D:
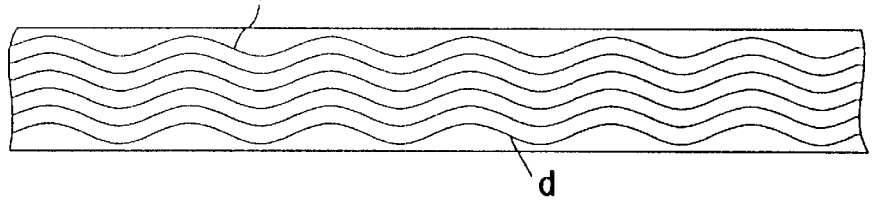
Figure 1E:
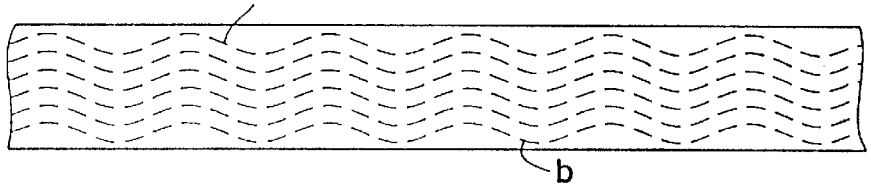
Figure 1F:
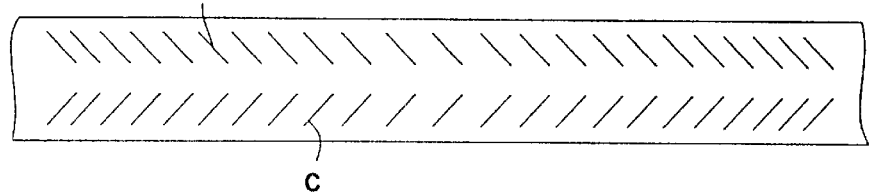

FIGS. 1D, 1E and 1F show preferable examples capable avoiding the above problem.

In the example shown in FIG. 1D, processed lines d are formed by meandering the processed lines a in the example shown in FIG. 1A. Further, in the example shown in FIG. 1E, the dotted lines composed of the processed lines b are meandered in a waveshape in the example shown in FIG. 1B. Note that in this form, the processed lines b may be linear or may be curved depending upon the wave-shaped dotted lines to be formed.

In these examples, the cycle of the wavelength of both the processed lines is such that the waveshapes of the processed lines d or the processed lines b of at least upper and lower turns (adjacent turns) of the tape (which are in contact with each other on the surfaces thereof) are not overlapped when the tape is wound and made to a pancake or a cassette. The cycle may be constant, continuously changed or changed at random so long as the above conditions are satisfied.

In contrast, in the example shown in FIG. 1F, the intervals (in the lengthwise direction), at which the processed line segments c are formed in the oblique direction, are changed in the example shown in FIG. 1C.

The intervals at which the processed line segments c are formed are also set such that, when a tape is wound, the processed line segments of at least upper and lower turns (adjacent turns) of the tape are not overlapped. Further, when the processed line segments c are not overlapped, the forming intervals may be constant, continuous or changed at random.

Note that, in these tapes processed by the present invention, the dotted lines and the like formed by the respective processed lines and the respective processed line segments, which are disposed in the width direction, may be entirely the same dotted lines or dotted lines different from each other. Otherwise, the same dotted lines and the different dotted lines may be mixed.

The tapes, which have the recesses, preferably the processed lines or processed line segments as shown in FIGS. 1A–1F on the backing layers thereof reduce the air entrained by each of the tapes even if each of the tapes is transported or traveled in the tape manufacturing apparatus such as the blade machine, the wider and the like at the high speed. Further, even if air is entrained, it can be preferably removed from the processed lines.

Thus, according to the tape processed by the present invention, even if the tape is transported at the high speed, the tape does not slip by being floated above the capstan roller and the like of the manufacturing apparatus and the damage and dimensional error of the tape are not caused by the slip, whereby the magnetic tape having proper quality can be stably manufactured with high efficiency under proper production management by accurately transporting the tapes at the high speed.

Further, when the tape is wound, since air between the adjacent turns of tape can be preferably removed, the tape can be wound and made to the cartridge or the pancake having a beautiful wound appearance.

In particularly, according to the examples shown in FIGS. 1D–1F, when the tape is wound, the processed lines or the processed line segments are not overlapped at the same position. As a result, no uneven portion is formed on the magnetic layer and the tape can be touched against a magnetic head in the same manner as a tape without processed lines and the like, whereby property magnetic information can be recorded and reproduced stably.

Moreover, in the tape having the recesses on the backing layer thereof, since cupping as the curl of the tape in the width direction thereof is reduced as compared with conventional tapes, the deterioration of the outside appearance of the tape, the deterioration of the touch of the tape against a head, the damage of the edges of the tape and the like, which are caused by the cupping, can be greatly reduced as compared with those in the conventional tapes.

As an example, 20 pieces of grooves as shown in FIG. 1A, which had a width of 3 $\mu$m–10$\mu$m, a depth of 0.6 $\mu$m or less and extended in a lengthwise direction, were formed at intervals of 500 $\mu$m by processing a video tape of commercial use, which had a width of ½ inch (12.7 mm; normally, so-called half in tape) and a thickness of 13.5 $\mu$m and was transported at a tape traveling speed of 2.5 m/sec. using an argon ion laser having a wavelength of 514.5 nm and beam intensity of about 90 mW (on the surface of the tape).

A value of the cupping (a value of the cupping is minus when the curl of the tape is convex at the magnetic layer side) of a similar tape, on which no groove was formed, was –0.86 mm, whereas the value of the cupping of the tape on which the grooves were formed was –0.83 mm. That is, a size (absolute value) of the cupping was reduced by 0.03 mm. Note that the value of the cupping was calculated from the values obtained by measuring the width of the tape when it was placed on a plane and the width thereof when a glass sheet was placed on the tape placed on the plane with a comparator.

With the recent improvement of recording density, the head touch of the tape is adjusted and controlled with accuracy of microns ($\mu$m). when this matter is taken into consideration, it is admitted that the reduction of the size (absolute value) of the cupping in the amount of 0.03 exhibits significant improvement.

Moreover, according to the present invention, the cupping can be reduced by only the simple processing of the tape with the laser beam without the need of the increase in the thickness of the magnetic layer which is against the improvement of the recording density, the reduction of the thickness of the backing layer by which the strength of the tape is lowered and the change and the like of the prescription of the magnetic layer and the backing layer by which the characteristics of the tape are lowered.

A reason why the cupping can be reduced by the formation of the recesses on the backing layer is not apparent. However, according to the examination executed by the inventors, it is contemplated that since the stress produced in the width direction of a tape by the difference between the rate of shrinkage of the binder of the magnetic layer and the rate of shrinkage of the binder of the backing layer is discontinued by the recesses of the backing layer, force produced to the tape in the width direction thereof is reduced as a whole, and, as a result, the cupping can be prevented.

In the present invention, how the recesses are formed (formed patterns) are not limited to the illustrated examples and various types of recesses can be used and the patterns can be suitable set in accordance with the states and the like of the slip of the tape and the cupping thereof. For example, processed lines extending in the width direction of the tape may be formed or a multiplicity of circular or rectangular recesses may be formed. When grooves are formed in the width direction or the oblique direction, they may be formed so as to pass through the edges of the tape in the width direction or grooves may be formed so as to traverse the tape.

Further, at least two processed lines, which extend in the lengthwise direction, the width direction and the oblique direction, may be mixed, in which case the grooves may intersect with each other.

Note that, in any of the above cases, it is preferable that the recesses such as the processed lines, the processed line segments and the like are formed such that they are not overlapped on at least upper and lower turns (adjacent turns) of the tape along a line or on a plane as in the forms shown in FIGS. 1D–1F.

The shape (cross-sectional shape) of the recess is not particularly limited, and, for example, a rectangular shape as shown in FIG. 2A, a triangular shape as shown in FIG. 2B, a semi-circular (bow) shape as shown in FIG. 2C, and the like are exemplified.

These shapes can be realized by adjusting the distribution of intensity of the beam spot of a laser beam (profile) for processing a backing layer.

In the present invention, the depth of the recess is not particularly limited. In general, deeper recesses can preferably prevent the slip in the transportation of a tape and cupping. In contrast, as the recesses are made deeper, the strength of the tape is lowered and the magnetic layer is adversely affected thereby in an extreme instance.

Therefore, the depth of the recesses can be suitably determined in accordance with required tape strength, the states of sip, cupping and the like in consideration of the tape width, a material for forming the backing layer and the thickness thereof, a material for forming the base layer and the thickness thereof, and a load (transportation speed, tension and the like) imposed on the tape in the processes after the recesses have been formed and in the processing executed in a user. When, for example, sufficient strength can be secured, recesses whose depth reach the base layer may be formed (the backing layer is removed).

Note that, according to the examination of the inventors, it is preferable to set the depth of the recess to at least 0.1 $\mu$m, and in particular it is more preferable to set the depth to at least 0.2 $\mu$m to obtain an excellent cupping preventing effect and cupping reducing effect. When the tape includes a plurality of recesses, the depths thereof may be the same or different from each other.

Further, the size of the recess (line width) and the forming density in which recesses are formed are not particularly limited. Larger forming density and larger size have higher effect for preventing slip and cupping similarly to the depth, whereas strength is lowered and the magnetic layer may be adversely affected. Therefore, the forming density and the size of the recess can be also suitably determined in accordance with the tape width, the material for forming the backing layer and the thickness thereof, the material for forming the base layer and the thickness thereof, the load imposed on the tape, the required tape strength, the states of slip and cupping, and the like.

For example, when processed lines and the like, which extend in the lengthwise direction as shown in FIG. 1A, FIG. 1B, FIG. 1D and FIG. 1E, are formed on the tape having the width of 0.5 inch (12.7 mm), it is preferable to form several to about one hundred pieces of processed lines each having a width of about 3 $\mu$m to 10 $\mu$m in the width direction.

FIG. 3 shows a conceptual view of a processing apparatus of the present invention for manufacturing the (magnetic) tape described above making use of the processing method of the present invention.

The illustrated processing apparatus 10 for forming processed lines and processed line segments(dotted lines composed of the processed line segments), which extend in the lengthwise direction of the tape as shown in FIG. 1(A) and FIG. 1(B), includes an optical system and a tape transportation device 24 (hereinafter, referred to transportation device 24). The optical system comprises a light source 12 for emitting a laser beam, a pulse modulator 14, a mirror 16, a beam expander 18, a beam profile forming unit 20 and a multiple-lens 22.

In the processing apparatus 10 arranged as described above, the processes lines and the processed line segments (hereinafter, both of them are also called processed lines as a whole) are formed on a (magnetic) tape T by allowing the laser beam emitted from the light source 12 to be incident on a predetermined processing position through the optical system while transporting the tape T, which is located at the processing position, in the lengthwise direction thereof (x-direction in the figure) by the transportation device 24.

The light source 24 is not particularly limited and various types of light sources (laser oscillators) can be used so long as they can emit at least one of a laser beam of an ultraviolet region and a laser beam of a visible region each having an output capable of processing the backing layer of the tape T. Note that a laser beam having a short wave length is preferable with respect to processability and thus the laser beam of the ultraviolet region is most preferable, whereas the laser beam of the visible region is preferable with respect to cost, workability and the like.

Specifically exemplified as the light source 12 are argon (ion) lasers of 488 nm and 515 nm (514.5 nm) and a light source (a wavelength conversion laser) for emitting a laser beam of 532 nm which is obtained by subjecting a YAG laser to wavelength conversion with a SHG (second harmonic generation) element, and the like.

As described above, in the processing apparatus 10 of the illustrated example, the optical system includes the pulse modulator 14, the mirror 16, the beam expander 18, the beam profile forming unit 20 and the multiple-lens 22.

The pulse modulator 14 subjects the laser beam to pulse modulation to form processed line segments b as shown in FIG. 1B and the like. Therefore, when the light source 12 can directly execute pulse modulation or when only processed lines a and processed line segments d as shown in FIG. 1A and FIG. 1D are formed, the pulse modulator 14 is not necessary.

A known modulation device such as an AOM (acousto-optical modulator) and the like can be used as the pulse modulator 14. Further, the length of the processed lines b may be adjusted by the adjustment of a modulation period.

The laser beam is reflected by the mirror 16 in a predetermined direction and incident on the beam expander 18.

The processing apparatus 10 forms processed lines on the tape T by dividing a single laser beam, and it is preferable that the processed lines can be formed on the entire surface of the tape T in the width direction thereof in correspondence to the tape T having various widths. In general, however, the diameter of a laser beam emitted from a light source is about 1 mm and the tape T is wider than the diameter. Thus, the entire surface of the tape T in the width direction thereof cannot be processed with the laser beam as it is.

To cope with this problem, the beam expander 18 is disposed in the processing apparatus 10 to increase the diameter of the laser beam emitted from the light source 12. When, for example, the diameter of the laser beam emitted from the light source 12 is 1 mm and the width of the tape T is 0.5 inch (12.7 mm), it is sufficient to expand the diameter of the laser beam to about 15 times to 20 times. Further, the expanding ratio of the laser beam at the beam expander 18 may be adjustable.

The laser beam whose diameter has been expanded by the beam expander 18 is then incident on the beam profile forming unit 20 (hereinafter, referred to as a forming unit 20). The forming unit 20 make the intensity of the laser beam substantially uniform on the entire surface of a beam spot. That is, the forming unit 20 makes the distribution of intensity of the laser beam substantially uniform.

Ordinarily, since the laser beam emitted from the light source 12 has a distribution of intensity such as Gaussian distribution, when the tape T is processed with the laser beam, the depths of the processed lines are made different depending upon the distribution of intensity. In contrast, the provision of the forming unit 20 makes the distribution of intensity of the laser beam uniform so that the depths of the processed lines can be made substantially uniform.

Note that various types of optical filters, an aperture having the same diameter as that of the laser beam for forming a beam profile making use of Fresnel diffraction, or the like can be used as the forming unit 20.

When the optical filter and the aperture are used as the forming unit 20, the intensity of the laser beam is lowered in accordance with forming intensity. In the present invention, however, the beam profile is not necessarily made uniform and it is sufficient to form the profile of the laser beam in such a degree that the variation of the depths of processed lines does not become a problem in accordance with processed lines and the like to be formed.

On the contrary, the depths of respective processed lines may be suitably adjusted (selected) by providing the laser beam with distribution of intensity by the forming unit 20 when necessary.

Further, processed lines having depths in accordance with the distribution of intensity of the laser beam may be formed without the provision of the forming unit 20.

Subsequently, the laser beam is incident on the multiple-lens 22.

The multiple-lens 22 is composed of a multiplicity of microball lenses, SELFOC lenses, micro-mold lenses or the like which are disposed in a direction perpendicular to the optical axes thereof with the optical axes being in parallel with the laser beam. The multiple lens 22 divides the laser beam incident thereon into a multiplicity of laser beams which are incident on the predetermined processing position (or positions) and applies them to the predetermined processing position (or positions) so that they are imaged thereon. With this operation, the backing layer of the tape T is processed with the laser beams and processed lines and the like (recesses) are formed.

FIG. 4 shows a schematic view of an example of the multiple-lens 22 observed from the direction of the optical axes thereof.

Figure 4A:
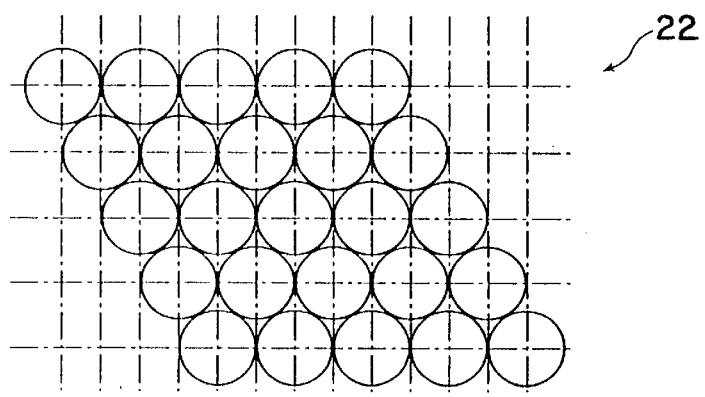
FIGS. 4A and 4B are conceptual views explaining a multiple-lens used in the magnetic tape processing apparatus shown in FIG. 3.
Figure 4B:
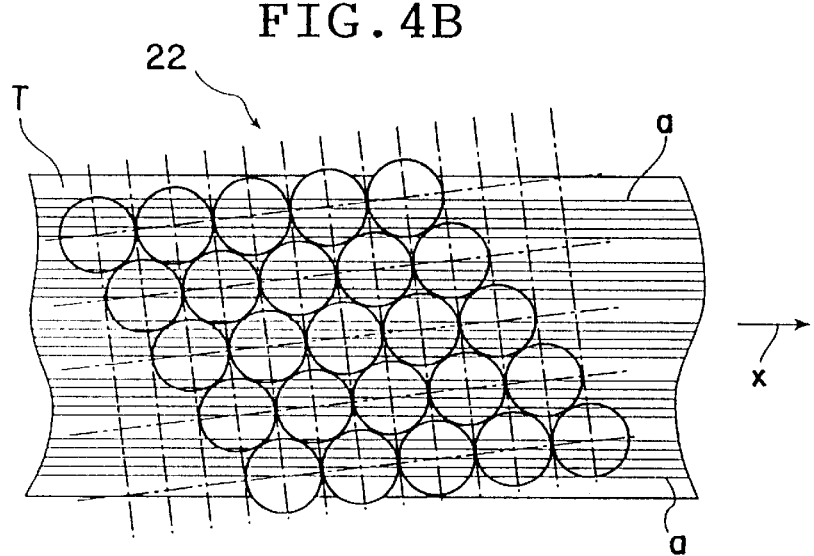

As an example, the multiple-lens of the illustrated example is arranged such that 5×5 pieces of microball lenses, SELFOC lenses, micro-mold lenses or the like (hereinafter, both of them are called lenses as a whole) are disposed in the densest state as shown in FIG. 4A, and the disposing lines, which are shown by dot-and-dash lines and along which the lenses are disposed, are somewhat tilted with respect to the transporting direction x of the tape T as shown in FIG. 4B.

With this arrangement, the processed lines a of 25 pieces in total extending in the lengthwise direction of the tape T, can be formed by transporting the tape T only once (1 pass) in the lengthwise direction. Further, dotted lines composed of 25 rows of the processed line segments b can be formed by driving the pulse modulator 14.

The intervals of the processed lines a can be adjusted by adjusting the angles between the transporting direction x and the disposing lines of the lenses. The angles must be set such that the optical axes (centers of beam waist) of the respective lenses are not overlapped in the transporting direction x in order to effectively form processed lines.

Figure 5:
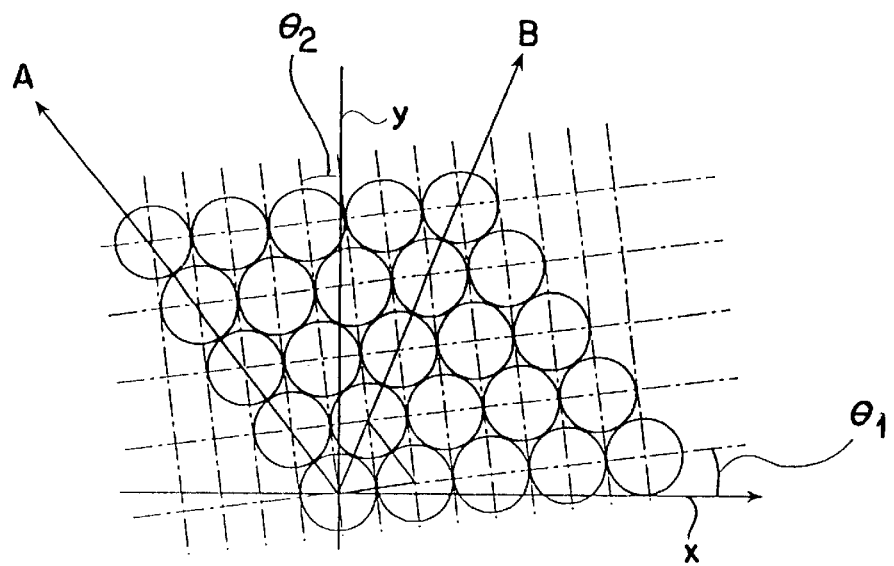
FIG. 5 is a conceptual view explaining the multiple-lens used in the magnetic tape processing apparatus shown in FIG. 3.

As shown in FIG. 5, when attention is paid to the disposing line of the lenses in a direction A, the optical axes of the lenses are not overlapped in the transporting direction x if the following formula is satisfied.

$$\sin[(2\pi/3)+\theta_1] \geq N \cdot \sin \theta_1$$

where, N shows the number of lenses in one disposing line and $\theta_1$ shows the angle between the transporting direction x and the disposing direction.

Accordingly, the angle $\theta_1$ at which the optical axes of the lenses are not overlapped can be calculated by the following formula.

$$\theta_1 \leq \tan^{-1}[\{\sin(2\pi/3)/\}/\{N-\cos(2\pi/3)\}]$$

Similarly, when attention is paid to the disposing line of the lenses in a direction B, the optical axes of the lenses are not overlapped in the transporting direction x when the angle $\theta_2$ between the width direction of the lenses (direction perpendicular to the transporting direction x, that is, y-direction) and the disposing direction of the lenses satisfies the following formula.

$$\theta_2 \leq \tan^{-1}[\{\sin(\pi/3)]\}/\{N-\cos(\pi/3)\}]$$

Figure 6:
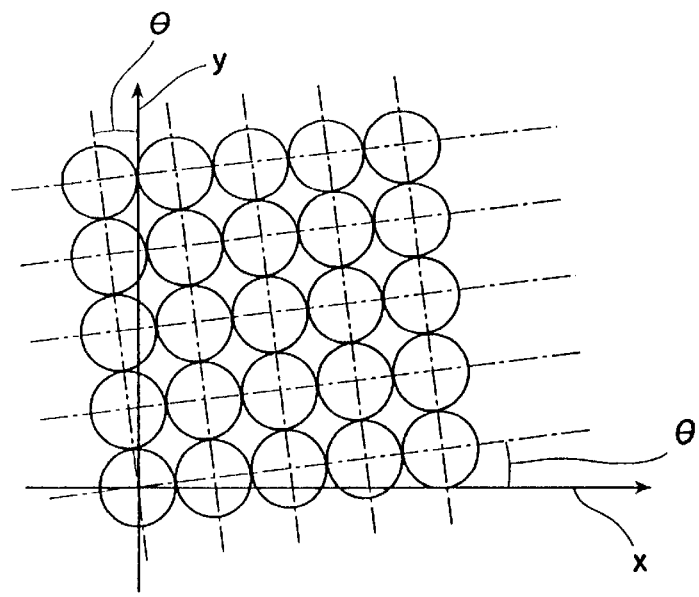
FIG. 6 is a conceptual view showing another example of the multiple-lens used in the magnetic tape processing apparatus shown in FIG. 3.

In the present invention, the lens disposition of the multiple-lenses is not limited to the very dense state shown in FIG. 4 and the like but various types of disposition can be used. For example, the lenses may be disposed in a grid state as shown in FIG. 6. Otherwise, lenses may be disposed in one row or a plurality of rows in a direction having an angle with respect to the transporting direction x.

As shown in FIG. 6, when the lenses are disposed in the grid state, the optical axes of the lenses are not overlapped in the transporting direction x if the angle θ between the transporting direction x (or the y-direction) and the disposing line of the lenses satisfies the following formula.

$\theta \leq \tan^{-1}(1/N)$

Note that processing intensity may be increased by forming one processed line with a plurality of laser beams by overlapping the optical axes of lenses in the transporting direction x when necessary.

In the processing apparatus 10, the tape T is transported in the lengthwise direction by the transportation device 24 with its backing layer side (back surface side) facing the upper stream of the light paths of the laser beams while positioned at predetermined processing position (or positions) by a tape flatener 30 (transported in a predetermined direction with the transporting direction x in agreement with the lengthwise direction).

The transportation device 24 basically makes use of a known magnetic tape transportation device (traveling device) and includes a transportation drive device such as a capstan roller, a rewinder, a winder and the like which are not shown, guide rollers 26 and 28. The tape flatener 30 functions a device for securing the flatness of the magnetic tape transported by the transportation device 24 at the predetermined processing position or positions. Further, the transportation device 24 may include a position regulating device such as a crown roller, a roller with a collar or the like for regulating the position of the tape T in the width direction thereof when necessary. Otherwise, the guide rollers 26 and 28 may be used as a width-directional position regulating device in place of the crown roller or the like.

The tape flatener 30 is touched against the surface (on the magnetic layer side) of the tape T being transported and positions (holds) the tape T at the predetermined processing position or positions (hereinafter, referred to processing positions as a whole).

The transportation passage of the tape T, which passes below the tape flatener 30, is formed by the guide rollers 26 and 28 disposed in the transporting direction x across the tape flatener 30. With this arrangement, the tape T is positioned at the processing positions by being pressed against the tape flatener 30 and supported thereby on it.

In the present invention, since the processing executed by the laser beams is micro-processing as shown in the above example of the tape T having the width of 0.5 inch (12.7 mm) (processing width; 3 $\mu$m–10 $\mu$m), the diameter of the beam spots incident on the processing positions is small, that is, the permissible range of the beam waist is very narrow.

Therefore, it is requested that the tape flatener 30 positions the tape T with high accuracy, preferably with accuracy having an error of 10 $\mu$m or less in the focal depth direction of the multiple-lens 22.

Figure 7A:
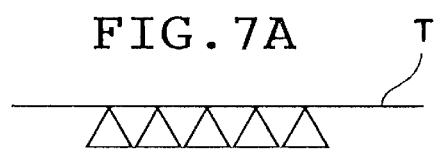
FIGS. 7A, 7B, 7C and 7D are conceptual views of examples of a tape flattener used in the magnetic tape processing apparatus shown in FIG. 3. respectively.

Exemplified preferably as the tape flatener 30 for realizing the above requirement are at least two triangular prisms (blade edge type) which are disposed in the transporting direction x in such a manner that the lateral edges thereof are located perpendicularly to the transporting direction x so as to support the tape T, as shown in FIG. 7A.

Figure 7B:
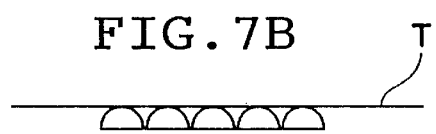
Figure 7C:
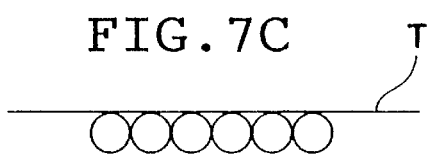
Figure 7D:
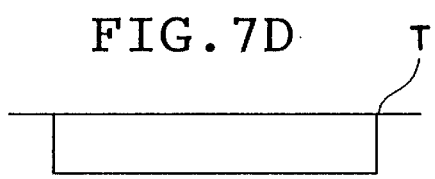

In addition to the above, preferably exemplified are a tape flatener composed of a plurality of support members as semi-circular (D-shaped) columns disposed similarly so as to support the tape T on the side surfaces thereof as shown in FIG. 7B, a tape flatener composed of a plurality of support members as columns disposed similarly so as to support the tape T on the side surfaces thereof as shown in FIG. 7C, a plate (rectangular prism) type flatener as shown in FIG. 7D, and the like.

As described above, the laser beam, which was emitted from the light source 12, subjected to pulse modulation by the pulse modulator 14 when necessary and reflected by the mirror 16, whose diameter was expanded by the beam expander 18, whose distribution of intensity was made uniform by the forming unit 20, and which was divided and whose light was adjusted by the multiple-lens 22 is incident on the processing positions and imaged thereon.

Therefore, when the tape T is transported in the lengthwise direction by the transportation device 24 while positioned at the processing positions by the tape flatener 30 in the state that the backing layer side thereof faces the upper stream of the light paths of the laser beams (on the side from which the laser beams are incident), processed lines (recesses) extending in the lengthwise direction are formed on the backing layer of the tape T. That is, 25 pieces of processed lines are formed in the above example when the tape T is transported once.

In the present invention using the laser beams of the visible light region or the ultraviolet region or both, it is contemplated that the backing layer is processed by the complex occurrence of both the thermal processing by the laser beams and the processing by ablation (dissociation and separation) executed by the laser beams.

When the wave-shaped processed lines d and the wave-shaped dotted lines composed of the processed line segments b as shown in FIG. 1D and FIG. 1E are formed, at least one of a beam moving device 42 and a tape moving device 44 is disposed to the processing apparatus 10 shown in FIG. 3.

The beam moving device 42 continuously reciprocates the imaging positions of the laser beams at the processing positions in the width direction by reciprocating the multiple-lens 22 in the width direction.

In contract, the tape moving device 44 reciprocates the tape T at the processing positions in the width direction by reciprocating the transportation device 24 (the guide rollers 26 and 28 and the tape flatener 30 in the illustrated example) in the width direction.

Accordingly, the wave-shaped processed lines d and the wave-shaped dotted lines composed of the processed line segments b as shown in FIG. 1D and FIG. 1E can be formed by driving at least one of the beam moving device 42 and the tape moving device 44 while processing the above backing layer of the tape T.

A method of moving the multiple-lens 22 or the transportation device 24 in the beam moving device 42 or the tape moving device 44 is not particularly limited and various types of methods can be used. Exemplified as preferable examples are a method of using a piezo-electric element, a method of using a voice coil, and the like.

Note that, in any of the methods, the multiple-lens 22 and the transportation device 24 are moved in such a manner that the wave-shaped processed lines formed on the tape T are not overlapped on at least upper and lower turns (adjacent turns) of the tape as described above.

In the illustrated example, the beam moving device 42 reciprocates the laser beams in the width direction at the processing position by reciprocating the multiple-lens 22. However, the present invention is not limited thereto and the laser beams may be reciprocated in the width direction at the processing positions by arranging the light source 12 and the optical system as a unit and reciprocating the unit.

In the present invention, process wastes such as powder dusts and the like and gases are often produced when the backing layer of the tape T is processed.

To cope with this problem, it is preferable to dispose a removing device at the processing position to remove the process wastes and the gases. Further, it is preferable to dispose a cleaning device downstream of the processing position to remove foreign matters adhered to at least the back surface of the tape T and particularly to the front and back surfaces thereof.

A scrubber and a suction device such as a local ventilation device and the like can be used as the removing device, and any known method executed when a magnetic tape is manufactured such as a method of using a cleaning tape, and the like can be used as the cleaning device.

The laser beam is divided into the plurality of laser beams using the multiple-lens 22 and imaged on the processing positions in the processing apparatus 10 shown in FIG. 3. However, the present invention is not limited thereto and various types of arrangements can be used.

Figure 8:
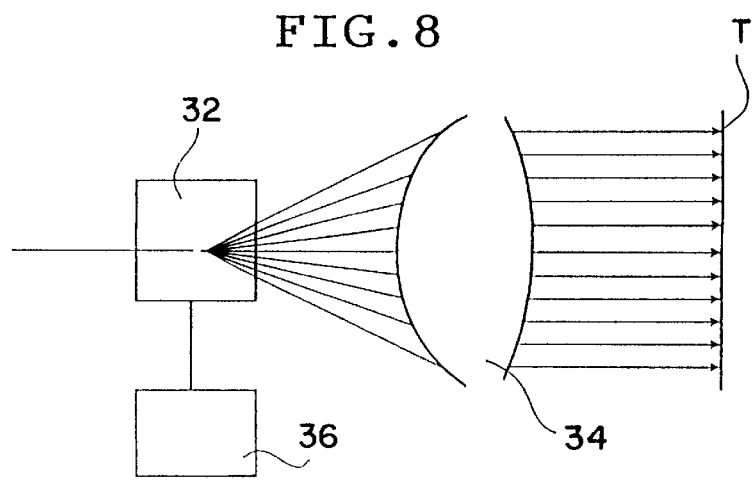
FIG. 8 is a conceptual view explaining an embodiment of an optical system used in the magnetic tape processing apparatus shown in FIG. 3.

For example, a method of using an AOM (acousto-optic modulator) 32 and an imaging lens 34 as shown in FIG. 8 in place of the multiple-lens 22 is exemplified. Note that, in FIG. 8, the tape T is transported in the direction vertical to the sheet. Further, in the example, the forming unit 20 may not be used, and when the laser beam has a sufficient beam diameter, the beam expander 18 also may not be used.

In the example, the AOM 32 is used as a laser beam dividing device and a plurality of frequency signals are input to the AOM 32 by a driver 36 (or frequency signals are continuously varied). With this operation, a multiplicity of Bragg diffraction are generated and laser beams are emitted at a multiplicity of Bragg angles.

The plurality of laser beams are made to light beams, which are in parallel with each other and imaged on processing positions by the imaging lens 34, whereby a plurality of processed lines extending in the lengthwise direction can be formed similarly to the above examples.

In the example, when the laser beams are reciprocated in the width direction to form the wave-shaped processed lines d and the like as shown in FIG. 1D and so on, the optical system including the light source may be entirely reciprocated in the width direction or only the imaging lens 34 may be reciprocated in the width direction.

Figure 9:
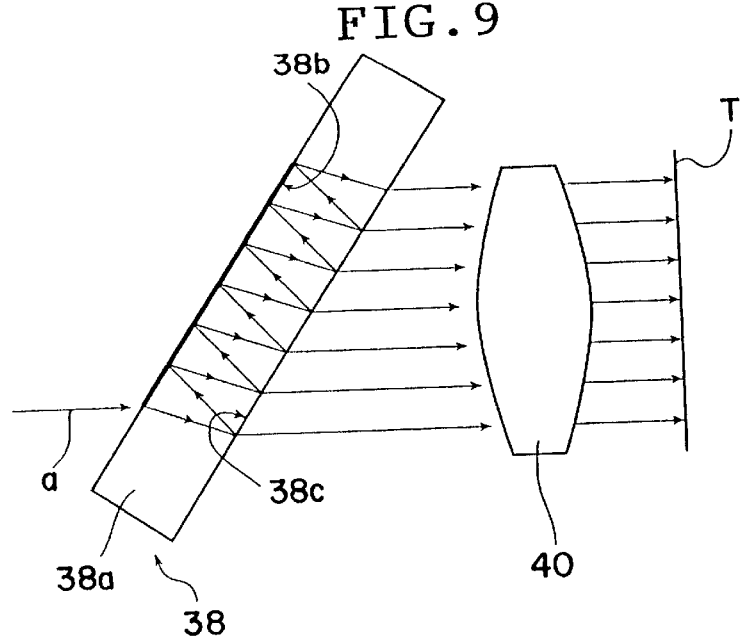
FIG. 9 is a conceptual view explaining another embodiment of the optical system used in the magnetic tape processing apparatus shown in FIG. 3.

FIG. 9 shows another example. The example employs a dividing device 38 and an imaging lens 40 in place of the multiple-lens 22 in the processing apparatus 10 shown in FIG. 3 similarly to the example shown in FIG. 8. Also in the figure, the tape T is transported in the direction vertical to the sheet and the forming unit 20 and the beam expander 18 may not be disposed.

The dividing device 38 is composed of a parallel plane glass substrate 38a having an inner side to which laser beam reflecting coating is applied and divides a laser beam making use of multiple-reflection.

As shown by the arrows a in FIG. 9, a laser beam is incident on the dividing device 38 (parallel plane glass substrate 38a) and repeats reflection in the parallel plane glass substrate 38a under the action of a coated reflecting film 38b and a surface 38c confronting the reflecting film 38b, as shown in the figure. When the laser beam is incident on the surface 38c, it is projected from the parallel plane glass substrate 38a in accordance with its reflectance ratio and made to divided laser beams. Therefore, the number of division can be set by the incident angle of the laser beam incident on the parallel plane glass substrate 38a.

The laser beams projected from the surface 38c are imaged on the processing positions by the imaging lens 40. With this operation, a plurality of processed lines extending the lengthwise direction can be formed of the backing layer of the tape T similarly to the above examples. Note that a plurality of imaging lenses 40 may be disposed in accordance with the respective divided laser beams or the lens power (refracting power) of the imaging lens 40 may be changed in the width direction.

In the example shown in FIG. 9, the intensity of the projected laser beams may be adjusted by adjusting the reflectance ratio of the parallel plane glass substrate 38a. Note that the reflectance ratio of the surface 38c may be adjusted over the entire surface thereof or only in the regions thereof on which the laser beams may incident.

Further, the forming density of processed lines and the processing intensity and the like thereof may be improved by applying a plurality of laser beams in the transporting direction x or applying a plurality of laser beams having a different incident angle to the parallel plane glass substrate 38a, similarly to the above examples.

In the example, when the laser beams are reciprocated in the width direction to form the wave-shaped processed lines d and the like as shown in FIG. 1D and the like, the optical system including the light source may be reciprocated in the width direction as a whole or only the imaging lens 40 may be reciprocated in the width direction.

Figure 10:
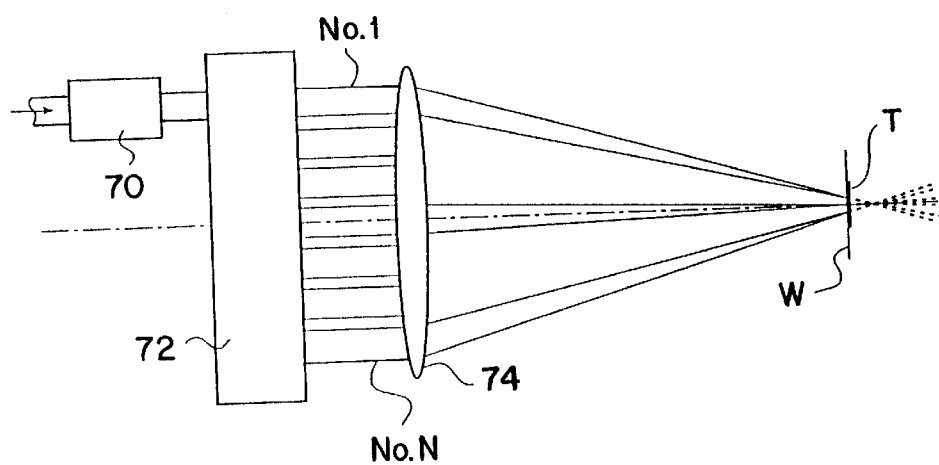
FIG. 10 is a conceptual view explaining another embodiment of the optical system used in the magnetic tape processing apparatus shown in FIG. 3.

FIG. 10 shows another example. In the example, a beam waist position adjustment device 70, a beam splitter 72 and a converging lens 74 are disposed to the processing apparatus 10 in place of the multiple-lens 22 similarly to the above example. Also in the figure, the tape T is transported in the direction vertical to the sheet at the processing position.

Further, a forming unit 20 may not be used, and when the laser beam has a sufficient beam diameter, a beam expander 18 may not be disposed also in the example.

In the example shown in FIG. 10, the laser beam is divided in the width direction of the tape T in accordance with the number of processed lines to be formed by the beam splitter 72 (beam No. 1–Beam No. N) after the beam waist position of the laser beam has been adjusted by the beam waist position adjustment device 70. The divided laser beams are converged by the converging lens 74 and incident on the backing layer of the tape T at the processing positions.

With this operation, a multiplicity of processed lines extending in the transporting direction (lengthwise direction) of the tape T are formed in accordance with the number of the laser beams which were divided and incident on the backing layer of the tape T, similarly to the pervious examples.

In the example, the processing positions are not the positions where the laser beams are converged (imaged) by the converging lens 74 but the beam waist positions W of the laser beams adjusted by the beam waist position adjustment device 70.

Note that, since the lengths of the light paths of the respective laser beams divided by the beam splitter 72 are substantially the same as shown in FIG. 10, the beam waist positions W of the respective laser beams are located on substantially the same plane.

The beam waist position adjustment device 70 is a known adjustment device for adjusting the waist position of a laser beam. Exemplified as the beam waist position adjustment device 70 is, for example, a device for adjusting the beam waist position based on the calculation made by the ABCD matrix obtained by H. Kogelnik using, for example, a set of lenses whose positions on an optical axis and whose intervals can be adjusted.

The beam splitter 72 is also not particularly limited and various types of known beam splitters such as a beam splitter using a dielectric multi-layer film, and the like can be used so long as they can divide a single laser beam into a plurality of laser beams. Note that it is preferable to adjust the transmittance and the like of a dielectric film so that the respective laser beams have the same intensity in order to make the depths of respective processed lines and the like uniform. Otherwise, the depths of the respective processed lines and the like may be adjusted by the adjustment of the transmittance and the like.

Further, it is preferable to use a lens having a less amount of curvature of field as the converging lens 74 to properly form processed lines and the like in accordance with the intensities of the laser beams.

The beam waist positions W may be located upstream of a converging position as shown in the illustrated example or may be located downstream thereof.

Further, it is possible in the example to adjust the intervals of the processed lines and the like and further the number of the processed lines (to make the number of them smaller than the number of beams N) by adjusting the beam waist positions W by the beam waist position adjustment device 70.

Figure 11:
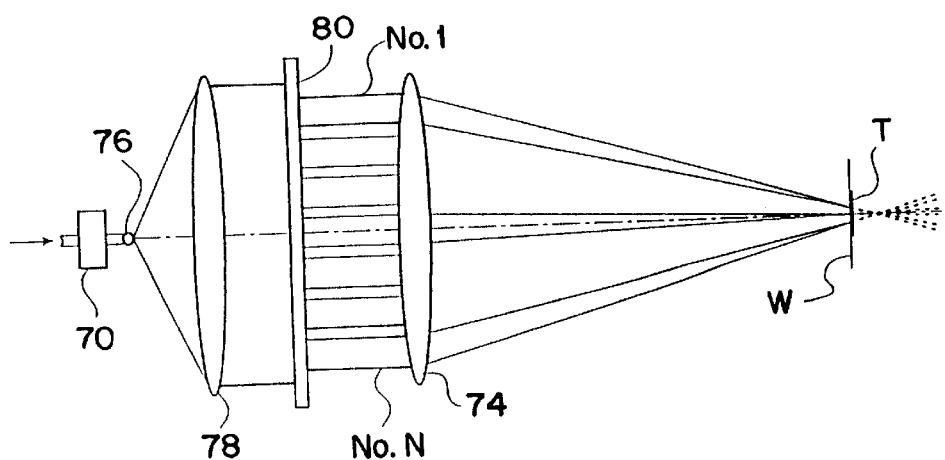
FIG. 11 is a conceptual view explaining another embodiment of the optical system used in the magnetic tape processing apparatus shown in FIG. 3.

FIG. 11 shows another example. In the example shown in FIG. 11, processed lines and the like are formed by an action similar to that of the example shown in FIG. 10. A laser beam dividing device is composed a rod lens 76, a cylindrical lens 78 and an aperture plate 80 having a multiplicity of apertures in place of the beam splitter 72 disposed in the example shown in FIG. 10. Note that, in the example, it is preferable for the example to include a forming unit 20.

That is, the laser beam whose beam waist position has been adjusted by a beam waist position adjustment device 70 is expanded in the width direction of the tape T by the rod lens 76 and then made to parallel rays by the cylindrical lens 78. Subsequently, the laser beam is incident on the aperture plate 80 having the multiplicity (N pieces) of apertures (holes) disposed in the width direction of the tape T, and the laser beam having passed through the holes is divided into N pieces of laser beams. Then, the divided laser beams are incident on a converging lens 74 and converged thereby and then incident on the backing layer of the tape T, thereby forming processed lines.

The distance between the aperture plate 80 and the converging lens 74 is determined taking into consideration the diffraction effect by the apertures. Alternatively, the diffraction effect by the apertures may be previously considered to adjust the beam waist position.

Since light modulation is carried out using the cylindrical lens 78 in the example, the ratios (beam diameters) of the laser beams converged by the converging lens 74 are changed in an x-y direction (in the illustrated example, the width direction and the lengthwise (transporting) direction). To cope with this problem, the laser beams must be formed so that the ratios in the x-y direction are in agreement with each other in some cases. At the time, when processability and the like are taken into consideration, it is preferable to form the laser beams so that they are narrowed in the width direction of the tape T.

Figure 12:
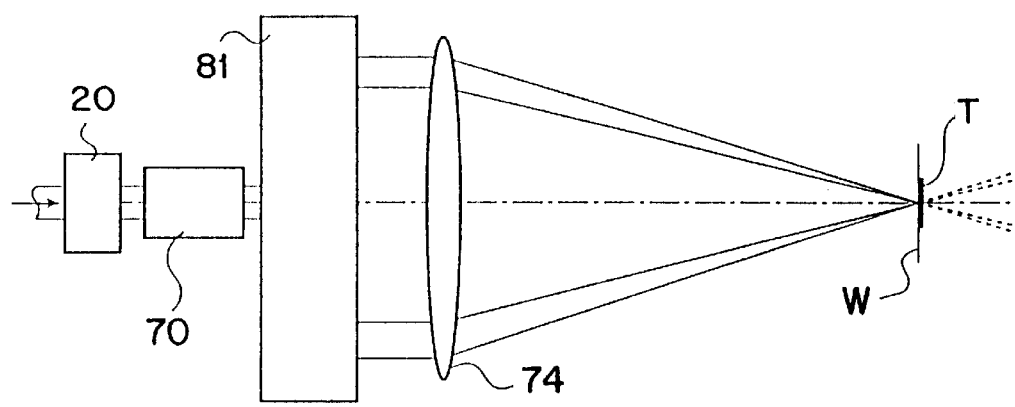
FIG. 12 is a conceptual view explaining another embodiment of the optical system used in the magnetic tape processing apparatus shown in FIG. 3.

FIG. 12 shows still another example. In the example, a multiplicity of laser beams are formed making use of the interference of a laser beam. A beam waist position adjustment device 70, a beam splitter 84 and a converging lens 74 are disposed in place of the multiple-lens 22 of the processing apparatus 10 shown in FIG. 3.

Note that the tape T is transported in the direction vertical to the sheet at the processing positions also in the figure. Further, a forming unit 20 and a beam expander 18 may not be disposed also in the example.

In the example shown in FIG. 12, the beam profile of the laser beam is formed by the forming unit 20 which is used as a preferable example and the beam waist position W thereof is adjusted by the beam waist position adjustment device 70. Thereafter, the laser beam is divided into two laser beams in the width direction of the tape T by the beam splitter 84.

The two laser beams are converged by the converging lens 74. In the example, the beam waist positions W of the respective laser beams are adjusted by the beam waist position adjustment device 70 so that the beam waist positions W are in agreement with converging positions and the beam waist positions W are used as processing positions.

The two laser beams, which have been converged at the processing positions with the beam waist positions W thereof in agreement with each other, interfere with each other by intersecting in the width direction and form interference fringes, which extend in the transporting direction of the tape T and are disposed in the width direction, on the backing layer of the tape T.

As a result, a multiplicity of processed lines, which extend in the transporting direction (lengthwise direction) of the tape T, are formed on the backing layer of the tape T by the interference fringes in accordance with the number of the thus formed interference fringes, similarly to the previous examples.

In this form, the laser beams for processing the backing layer of the tape T are not dots but the interference fringes extending in the lengthwise direction. Therefore, when the processed line segments b as shown in FIG. 1B are formed by driving a pulse modulator 14, the minimum (shortest) size thereof is almost as long as the length of the interference fringes.

Further, various types of known beam splitters capable of dividing a laser beam into at least two laser beams can be used as the beam splitter 81. Furthermore, the divided number of the laser beams (that is, the number of laser beams to be interfered) is not limited to the two pieces the illustrated example, and interference fringes may be formed by interfering at least three laser beams when necessary.

In the examples shown in FIG. 10–FIG. 12, when the laser beams are reciprocated in the width direction to form the wave-shaped processed lines d and so on as shown in FIG. 1D and the like, the optical system including the light source may be reciprocated in the width direction as a whole or only the converging lens 74 may be reciprocated in the width direction.

Figure 13:
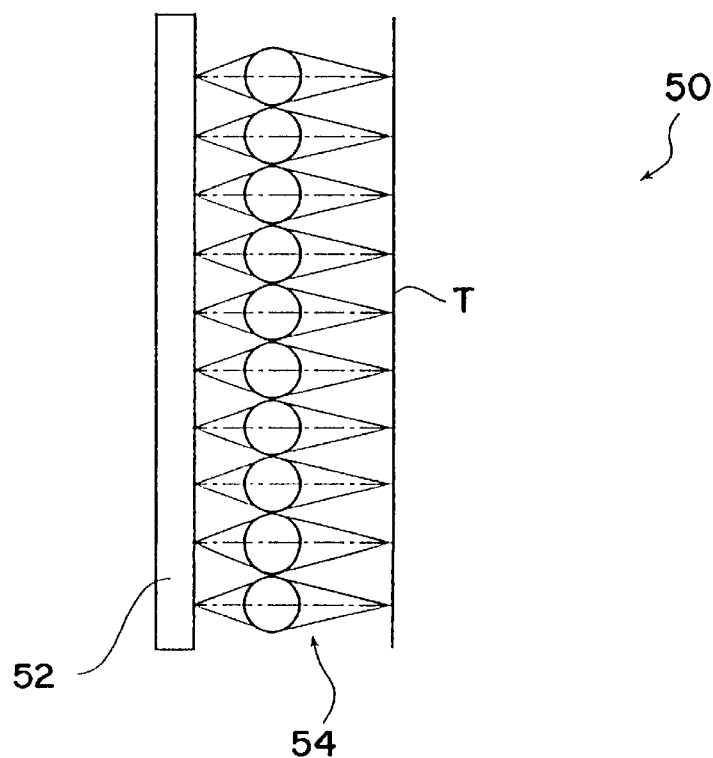
FIG. 13 is a conceptual view of another embodiment of the magnetic tape processing apparatus of the present invention.

FIG. 13 shows another example of the processing apparatus of the present invention for forming the processed lines (processed line segments) as shown in FIG. 1A and FIG. 1B, which extend in the lengthwise direction of the tape T, on the backing layer of the tape T.

Note that while FIG. 13 does not show a transportation device, it may be similar to that of the processing apparatus 10 shown in FIG. 3 also in the example. Further, the tape T is transported in the direction vertical to the sheet also in FIG. 13.

A processing apparatus 50 shown in FIG. 13 uses an LD array 52 and a lens array 54. The LD array 52 includes laser diodes (LD; laser diode) disposed therein which emit a laser beam in a visible region or an ultraviolet region, preferably a blue laser beam, and the lens array 54 includes lenses disposed therein which image the respective laser beams emitted from the respective LDs of the LD array 52 at the processing positions. The LD array 52 and the lens array 54 are disposed such that the directions in which they are disposed have an angle with respect to the transporting direction x.

Processed lines extending in the lengthwise direction can be formed on the backing layer of the tape T similarly by using the optical system arranged as described above and by transporting the tape T in the lengthwise direction by the transportation device while applying a multiplicity of laser beams to the processing positions.

Microball lenses, SELFOC lenses (GRIN lenses), micromold lenses, and the like are exemplified as the lenses constituting the lens array 54.

In addition, the LD array 52 (and further, the lens array 54) are not limited to the one in which the LDs are disposed in a single row but they may be disposed in a plurality of rows in the transporting direction. For example, the LDs may be disposed in the densest state or a grid state as in, for example, the above multiple-lens 22 so that processed lines can be formed more densely.

In the processing apparatus 50, when laser beams are reciprocated in the width direction to form the wave-shaped processed lines d and the like as shown in FIG. 1D and the like, the LD array 52 and the lens array 54 may be reciprocated together in the width direction or only any one of them may be reciprocated in the width direction.

Figure 14:
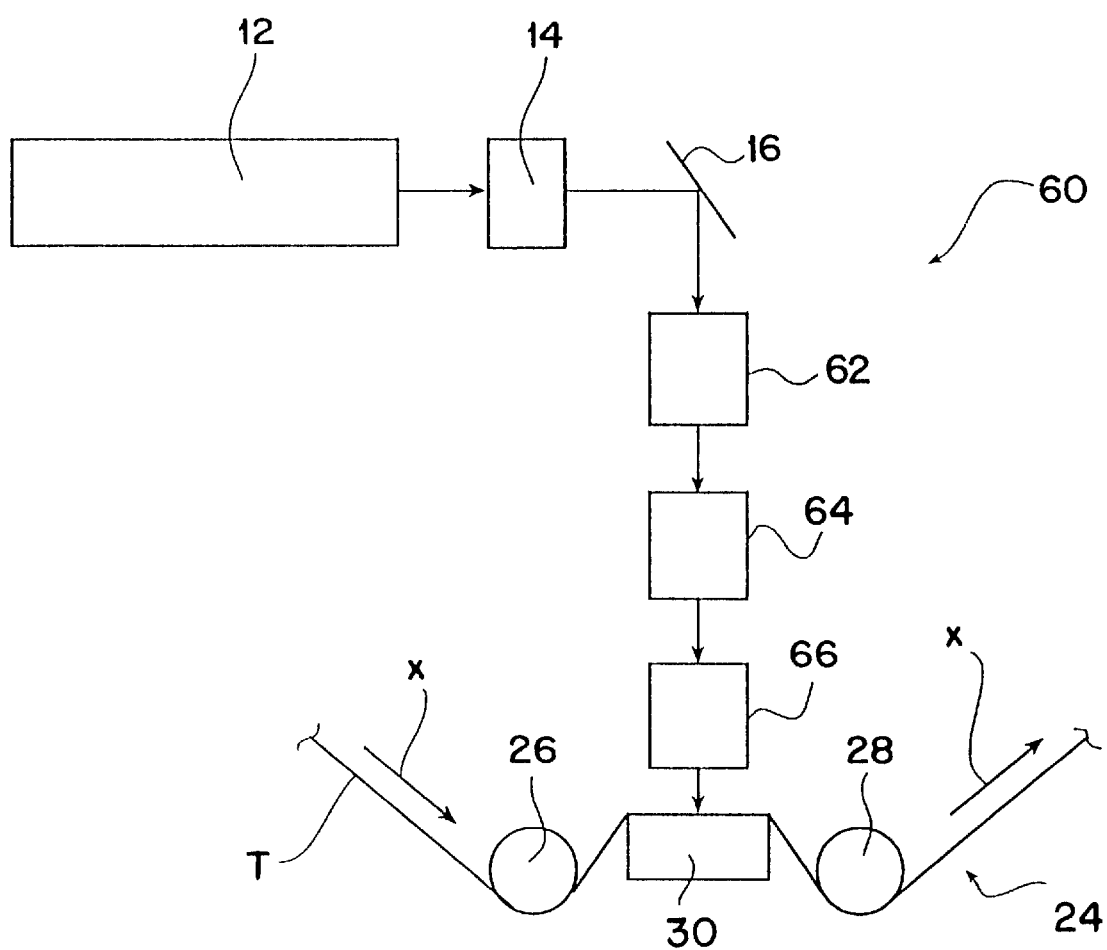
FIG. 14 is a conceptual view of another embodiment of the magnetic tape processing apparatus of the present invention.

FIG. 14 shows a schematic view of a processing apparatus for forming the processed lines (processed line segments) extending at an angle with respect to the lengthwise direction as shown in FIG. 1C. Note that since the example shown in FIG. 14 includes many components which are common to those of the processing apparatus 10 shown in FIG. 3, the same components are denoted by the same numerals and only different components will be mainly described.

The processing apparatus 60 shown in FIG. 14 comprises a light source 12, a pulse modulator 14, a mirror 16, an x-direction scanning element 62, a y-direction scanning element 64, a converging lens 66 and a transportation device 24.

That is, the processing apparatus 60 includes the x-direction scanning element 62, the y-direction scanning element 64 and the converging lens 66 disposed therein in place of the beam expander 18, the forming unit 20 and the multiple-lens 22 of the processing apparatus 10. Therefore, the laser beam emitted from the light source 12 is subjected to pulse modulation by the pulse modulator 14 when necessary, deflected by the mirror 16 and incident on the x-direction scanning element 62.

The x-direction scanning element 62 is a light scanning element for deflecting and scanning a laser beam in the transporting direction x. In contrast, the y-direction scanning element 64 is a light scanning element for deflecting the laser beam scanned with the x-direction scanning element 62 in the width direction.

The processing apparatus 60 of the illustrated example scans the laser beam in an oblique direction by the provision of the light scanning elements for deflecting and scanning the laser beam in the directions which are orthogonal to each other.

Note that the light scanning elements are not particularly limited and various types of known deflectors, for example, galvanometer mirrors, polygon mirrors, AODs (acoustic optical deflectors) and the like can be used.

The laser beam deflected in the oblique direction is incident on the converging lens 66, which has a sufficient area with respect to the region where the laser beam is deflected by the x-direction scanning element 62 and the y-direction scanning element 64 as well as has lens power in both the x- and y-directions and further incident and imaged on a predetermined scanning position corresponding to the processing position through a predetermined beam spot diameter to thereby form a scanning line. Note that it is preferable to use an fθ lens or the like as the converging lens 66.

As described above, the tape T is transported by a transportation device 24 in the lengthwise direction while positioned at the processing positions with the back surface thereof facing the upper stream of the light path of the laser beam. As a result, the processed lines extending in an oblique direction as shown in FIG. 1C are continuously formed on the backing layer of the tape T, whereby the tape T, on which a multiplicity of the processed line segments c are formed in the oblique direction, can be manufactured by transporting the tape T in the lengthwise direction only once.

When the processed lines c having different intervals as shown in FIG. 1F are formed by the processing apparatus 60, the intervals, at which the processed lines c are formed, may be adjusted by adjusting the intervals at which the laser beam is irradiated by the adjustment of the modulation carried out by the pulse modulator 14. In contrast, when the light source 12 can be directly modulated, the intervals, at which the processed line segments c are formed, may be adjusted by adjusting the intervals at which the laser beam is output from the light source 12.

Note that, also at the time, the intervals at which the processed line segments c are formed, that is, the modulation is adjusted so that they are not overlapped on at least upper and lower turns, that is, adjacent turns of the tape T when it is wound.

The aspect, in which the light beam is deflected and scanned as described above, is not limited to the one having the light deflecting elements in both the x- (lengthwise) direction and the width direction and it may include only one light deflecting element for deflecting the laser beam in the width direction or in the oblique direction. Since the tape T is transported in the x-direction at the processing position as described above, the scanning of the laser beam in the width direction and the application thereof to the tape T result in an oblique scanning line formed on the tape T depending upon the balance between the transporting speed of the tape T and the scanning speed of the laser beam, whereby the processed line extending in the oblique direction can be formed.

Further, the processed lines as shown in FIG. 1C may be formed using a plurality of optical systems having the same scanning direction (for example, width direction) and a different moving direction of scan (right to left, left to right and the like).

Figure 15B:
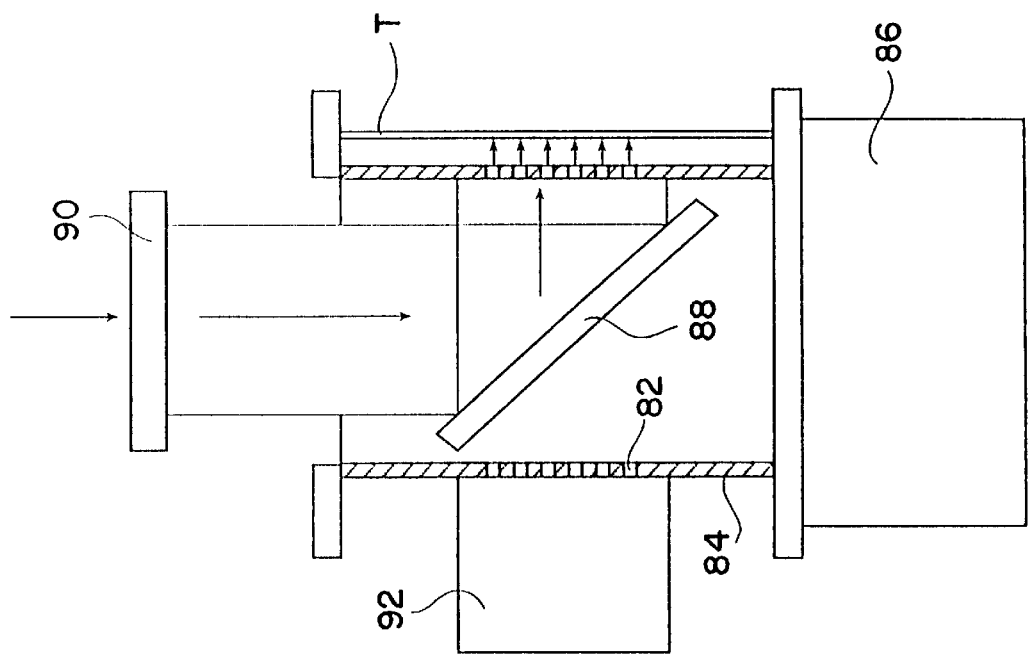
FIG. 15B is a conceptual schematic sectional view of the magnetic tape processing apparatus shown in FIG. 15A.
Figure 15A:
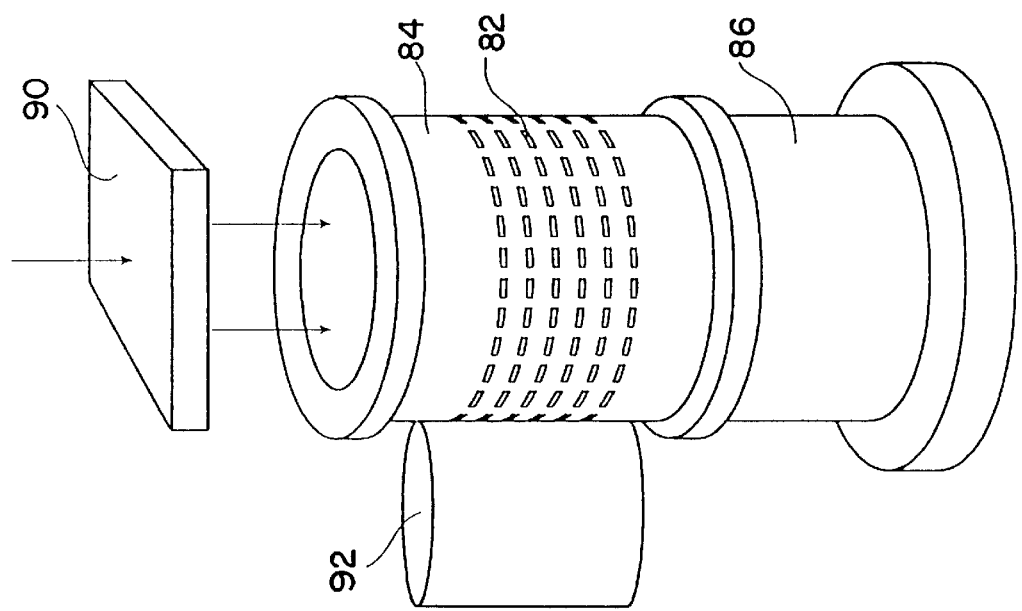
FIG. 15A is a conceptual schematic perspective view of another embodiment of the magnetic tape processing apparatus of the present invention.

FIGS. 15A and 15B show another example of the processing apparatus of the present invention. In FIGS. 15A and 15B, FIG. 15A shows a schematic perspective view and FIG. 15B shows a schematic sectional view (diagrammatic sectional view), respectively. Further, in FIG. 15A, the tape T is omitted to show the arrangement of the processing apparatus more clearly.

The example shown in FIGS. 15A and 15B use a cylindrical tape guide 84 composed of a hollow cylindrical drum having a multiplicity of apertures 82 (through holes) passing through a side wall. The illustrated example forms the processed lines b (dotted lines composed of the processed lines b) as shown in FIG. 1B and has a multiplicity of short segment-like apertures 82 which extend in the circumferential direction (rotating direction to be described later= lengthwise direction of the tape T) of the tape guide 84 and disposed in the circumferential direction and the axial direction thereof. In other words, a plurality of dotted lines, which are formed by the apertures 82 and extend in the circumferential direction are disposed in the axial direction.

Note that processed lines c extending in an oblique direction as shown in FIG. 1C can be formed by forming the apertures in the oblique direction. Further, a row of the apertures may extend in the axial direction. Otherwise, various types of processed lines may be formed by forming a plurality of types of the apertures.

The tape guide 84 is supported on the bottom thereof by a guide support member 86 so that it is rotated about an axial line (center line) and rotated by the travel of the tape T to be described later without slipping on the tape T. Note that the tape guide 84 may be rotated by a drive source provided with the guide support member 86.

Further, a mirror 88 is fixed in the interior of the tape guide 84 at an angle of 45° with its reflecting surface facing upward. Note that a method of fixing the mirror 88 is not limited and any known method can be used so long as it is fixed so as not to rotate together with the tape guide 84.

A laser beam for processing the backing layer of the tape T is emitted from a light source (not shown) similar to that of the above examples and made to a sheet-shaped (plane-shaped) laser light (hereinafter, referred to as sheet light) by a sheet-shaped laser light forming device 90.

The sheet light is applied to the interior of the tape guide 84 and incident on the inner surface of the tape guide 84 after its light path has been bent 90° by the mirror 88 to thereby draw a line (line drawn by the laser beam) extending in the axial direction of the tape guide 84 on the inner surface thereof. Note that the line drawn by the sheet light is not limited to that extending in the axial direction and may extend, for example, in a direction oblique to the axial direction. That is, it is sufficient that the sheet light is incident on a predetermined position of the inner surface of the tape guide 84 and draws the ray on it.

In the example, the tape T is transported in the lengthwise direction thereof so as to rotate the tape guide 84 about the axial line thereof while touching the backing layer thereof against a portion of the outer surface of the tape guide 84 (wound on the backing layer) so that the tape T includes a position corresponding to the position where the sheet light is incident on the inner surface. Note that, in FIG. 15B, the tape T is shown spaced apart from the tape guide 84 to clearly show action and further the apertures 82 are omitted in the portions other than sections.

As described above, the multiplicity of apertures 82 are formed on the side wall of the tape guide 84. Further, the sheet light, which has been made to a sheet shape by the sheet-shaped laser light forming device 90, reflected 90° by the mirror 88, is incident on the inner surface of the tape guide 84 and thereby draws the line in the axial direction of the tape guide 84 on the inner surface thereof.

Accordingly, the laser light of the sheet light, which has been incident on and passed through the apertures 82 of the tape guide 84, is projected from the tape guide 84, incident on the backing layer of the tape T as a row of divided laser beams and processes the backing layer, whereby the processed lines b as shown in FIG. 1B, for example, are formed on the backing layer.

Note that, in the processing apparatus, since the backing layer of the tape T is processed with the laser beams projected from the apertures 82 in the state that the backing layer is in contact with the outer surface of the tape guide 84, the apertures 82 may be clogged with powder dusts produced when the backing layer is processed.

To cope with this problem, in the illustrated example, processed line segments are formed while cleaning the outside wall of the tape guide 84 with a guide cleaner 92 touched against the outside wall as a preferable form. Note that the guide cleaner 92 is not particularly limited and any known cleaning method using the above cleaning tape, tissue paper, non-woven fabric and the like can be used.

In the example shown in FIGS. 15A and 15B, the sheet-shaped laser forming device 90 is not particularly limited and various types of known methods and devices may be used such as the method shown in FIG. 11, a method of using an optical element for making a laser beam to sheet light by combining cylindrical lenses, and the like.

The apertures 82 of the tape guide 84 can be formed by a known method. For example, a method of forming the apertures 82 by applying a processing laser such as a YAG laser or the like to a shading cylinder made of metal or the like is exemplified.

Otherwise, a mask pattern having light passing portions corresponding to the apertures 82 and shading portions may be formed on a transparent cylinder composed of quartz glass or the like. Note that a method of forming the mask pattern is not particularly limited and various types of known methods using a vapor-deposited thin film made by vapor deposition of metal, film transfer, print and the like can be used.

In the form using the cylindrical tape guide 84 of the present invention shown in FIGS. 15A and 15B, small lenses such as bead glasses, microball lenses, or GRIN (gradient index) lenses or rod lenses (so-called SELFOC lenses), micro-mold lenses or the like may be disposed to the apertures 82 and the laser beams passing through the apertures 82 may be imaged on the processing positions (the backing layer of the tape T located at the processing positions) through the lenses. Further, when the transparent cylinder is used as the tape guide, the small lenses may be disposed to the light passing portions corresponding to the apertures 82.

Note that the lenses disposed to the apertures 82 and the light passing portions may be inserted into the apertures 82 or buried in the transparent cylinder or may be fixed to at least one of the inner surface and the outer surface of the tape guide 84. Otherwise, both of the methods may be used together.

According to the arrangement, since the size of the apertures 82 and the light passing portions can be increased, the processability and the like of the tape guide 84 can be more enhanced, whereby the cost of the tape guide 84 can be reduced.

In the illustrated example, the tape T is processed by being located at the processing positions in such a manner that it is touched against the tape guide 84. However, the tape guide 84 and the above tape flatener 30 may be used together.

In this case, a rotating means is provided to rotate the tape guide 84 (cylinder with the apertures) and the tape guide 84 is rotated thereby in accordance with the transportation speed of the tape T. Any known means such as a roller touched against the tape guide 84, a belt wound around the tape guide 84 and the like can be used as the rotating device.

Note that in the form using the cylindrical tape guide 84, when a device such as the tape flatener 30 is used to support the tape T at the processing positions in place of the tape guide 84, the tape guide 84 may not be in contact with the tape T.

In the aspect in which the tape T is in contact with the tape guide 84, it is preferable that the rotating speed (peripheral speed) of the tape guide 84 is in agreement with the transportation speed of the tape T to prevent the damage of the tape T. In contrast, in the form in which both of them are not in contact with each other, the rotating speed of the tape guide 84 need not be always in agreement with the transportation speed of the tape T. Further, a processing pattern of the tape T may be changed or adjusted by adjusting any one of the rotating speed and the transportation speed.

The tape T may be processed according to the present invention described above at any step in a magnetic tape manufacturing process so long as it is processed after the backing layer has been formed. For example, the tape T may be processed before it is cut to a product width by a slitter or after it has been cut thereby.

While the magnetic tape processing method and apparatus and the magnetic tape of the present invention have been described above in detail, the present invention is by no means limited to the above examples and it goes without saying that various improvements and modifications can be made within the range which does not depart from the gist of the invention.

As described above in detail, according to the present invention, there can be effectively obtained a magnetic tape having excellent characteristics which does not slip on a capstan roller and the like even if its transportation speed is increased in a magnetic tape manufacturing apparatus such as a blade machine, a winder and the like and thus can be precisely transported at a high speed and moreover hardly causes cupping and in which a size of the cupping is small even if the cupping is caused.

Therefore, in the magnetic tape processed by the magnetic tape processing method and apparatus of the present invention, the occurrence of the slip on the capstan roller and the like can be prevented in spite of the increased transportation speed and the size of the cupping can become small and thus these excellent characteristics can be obtained.

The use of the magnetic tape permits to stably manufacture a magnetic tape without damage at a high production efficiency under proper production control. Further, when the magnetic tape is wound and made to a cartridge and a pancake, the would appearance thereof can be made beautiful. Furthermore, the deteriorated outside appearance of the magnetic tape, the deteriorated abutment of the tape against a head, the damage of the edges of the tape, and the like due to the cupping can be also prevented.

What is claimed is:

1. A magnetic tape processing apparatus comprising:
   at least one light source for emitting at least one laser beam in at least one of a visible region and an ultraviolet region;
   an optical system for applying said at least one laser beam emitted from said at least one light source to a predetermined processing position or positions;
   a transportation device for transporting a magnetic tape in a lengthwise direction of the magnetic tape at the predetermined processing position or positions in a state that a backing layer of the magnetic tape faces upper stream of at least one light path of said at least one laser beam; and
   a device for securing the flatness of the magnetic tape transported by said transportation device at the predetermined processing position or positions.

2. The magnetic tape processing apparatus according to claim 1, wherein said optical system includes a beam expander and a multiple-lens.

3. The magnetic tape processing apparatus according to claim 2, wherein said multiple-lens is arranged such that lenses disposed in at least one of a densest state, a grid state, and one row and a plurality rows in a direction having an angle with respect to the lengthwise direction.

4. The magnetic tape processing apparatus according to claim 3, wherein processing intensity of an recess formed on the backing layer is increased by forming the recess with a plurality of laser beams by overlapping optical axes of said lenses in the lengthwise direction.

5. The magnetic tape processing apparatus according to claim 1, wherein said optical system includes a beam waist position adjustment device, a laser beam divider and a converging lens.

6. The magnetic tape processing apparatus according to claim 1, wherein said at least one light source is composed of a semiconductor laser array and said optical system includes an imaging device for imaging laser beams emitted from the semiconductor laser array.

7. The magnetic tape processing apparatus according to claim 1, wherein said optical system includes a light deflecting element for scanning at least one laser beam at an angle with respect to a transporting direction of the magnetic tape transported by said transportation device and a scanning lens.

8. The magnetic tape processing apparatus according to claim 1, further comprising:
   at least one of a device for reciprocating the magnetic tape in a direction perpendicular to a transporting direction of the magnetic tape at the predetermined processing position or positions, device for reciprocating the laser beams in a direction perpendicular to the transporting direction of the magnetic tape at the predetermined processing position or positions, and a device for adjusting the intervals at which the laser beams are irradiated to the magnetic tape.

9. The magnetic tape processing apparatus according to claim 1, wherein said at least one light source is at least one of an argon laser of 488 nm, an argon laser of 515 nm and a wavelength conversion laser for emitting a laser beam of 532 nm which is obtained by subjecting a YAG laser to wavelength conversion with a second harmonic generation element.

10. The magnetic tape processing apparatus according to claim 1, wherein said transportation device comprises a transportation drive device including a capstan roller, a rewinder and a winder, and at least one guide roller, and wherein said securing device is a tape flatener.

11. The magnetic tape processing apparatus according to claim 10, wherein said tape flatener is touched against a surface on a magnetic layer side of the magnetic tape being transported and positions the magnetic tape at the predetermined processing position or positions.

12. The magnetic tape processing apparatus according to claim 10, wherein said at least one guide roller is two guide rollers are disposed in the lengthwise direction across said tape flatener, wherein a transportation passage of the magnetic tape formed by said two guide rollers is below a transportation passage of the magnetic tape formed by said tape flatener and wherein said magnetic tape is positioned at the processing position or positions by being pressed against the tape flatener and supported on the tape flatener.

13. The magnetic tape processing apparatus according to claim 10, wherein said tape flatener is at least one of at least two triangular prisms, a plurality of support members as semi-circular columns, a plurality of support members as columns and a plate type flatener.

14. The magnetic tape processing apparatus according to claim 8, wherein said laser beam reciprocating device is at least one of a piezo-electric element and a voice coil which move a multiple-lens of said optical system.

15. The magnetic tape processing apparatus according to claim 8, wherein wave-shaped recesses on the backing layer of the magnetic tape are formed by reciprocating the laser beams with said laser beam reciprocating device such that the wave-shaped recesses are not overlapped on at least upper and lower turns of the magnetic tape when the magnetic tape is wound.

16. The magnetic tape processing apparatus according to claim 8, wherein said laser beam reciprocating device is arranged said light source and said optical system as a unit and reciprocates the unit.

\* \* \* \* \*